US010883618B2

(12) United States Patent
Park

(10) Patent No.: US 10,883,618 B2
(45) Date of Patent: Jan. 5, 2021

(54) VALVE COUPLING HAVING CENTERING SUPPORT PROJECTIONS

(71) Applicant: Victaulic Company, Easton, PA (US)

(72) Inventor: Yang Bae Park, Easton, PA (US)

(73) Assignee: Victaulic Company, Easton, PA (US)

( * ) Notice: Subject to any disclaimer, the term of this patent is extended or adjusted under 35 U.S.C. 154(b) by 346 days.

(21) Appl. No.: 15/355,510

(22) Filed: Nov. 18, 2016

(65) Prior Publication Data
US 2017/0146143 A1 May 25, 2017

Related U.S. Application Data

(60) Provisional application No. 62/258,797, filed on Nov. 23, 2015.

(51) Int. Cl.
F16K 27/00 (2006.01)
F16K 1/20 (2006.01)
F16K 1/22 (2006.01)
F16L 21/03 (2006.01)
F16L 29/00 (2006.01)
F16K 1/226 (2006.01)
F16K 27/02 (2006.01)
F16L 19/02 (2006.01)

(52) U.S. Cl.
CPC ............ F16K 27/00 (2013.01); F16K 1/2028 (2013.01); F16K 1/2057 (2013.01); F16K 1/22 (2013.01); F16K 1/224 (2013.01); F16K 1/2263 (2013.01); F16K 27/0218 (2013.01); F16L 19/0206 (2013.01); F16L 21/03 (2013.01); F16L 29/00 (2013.01); F16L 29/007 (2013.01)

(58) Field of Classification Search
CPC . F16K 27/00; F16K 1/22; F16K 1/224; F16K 1/2263; F16K 27/0218; F16L 19/0206; F16L 21/03; F16L 23/08; F16L 29/00; F16L 29/007; B23P 19/00
USPC .................................................. 251/305, 367
See application file for complete search history.

(56) References Cited

U.S. PATENT DOCUMENTS

| 3,129,920 A | 4/1964 | Stillwagon |
| 3,217,746 A | 11/1965 | Voisine |
| 3,382,892 A | 5/1968 | Cerbin |
| 3,874,631 A | 4/1975 | Osthues |
| 4,111,391 A | 9/1978 | Pilolla |

(Continued)

FOREIGN PATENT DOCUMENTS

CN 100346096 10/2007

OTHER PUBLICATIONS

Copenheaver, Blaine R.; International Search Report from counterpart International patent application No. PCT/US2016/062785, dated Jan. 31, 2017, pp. 1-2, United States Patent and Trademark Office as Searching Authority, Alexandria, Virginia USA.

(Continued)

Primary Examiner — Kelsey E Cary
(74) Attorney, Agent, or Firm — Ballard Spahr LLP

(57) ABSTRACT

A valve coupling for joining pipe elements includes a valve housing surrounded by coupling segments. Projections extend from the segments and engage channels in the valve housing. Engagement between the projections and the channels guides the segments as they are drawn together to engage the pipe elements and secures the valve housing between the segments.

40 Claims, 14 Drawing Sheets

(56) References Cited

U.S. PATENT DOCUMENTS

| | | | | |
|---|---|---|---|---|
| 4,420,140 | A | * | 12/1983 | Gachot .................... F16K 1/22 |
| | | | | 251/152 |
| 4,653,724 | A | * | 3/1987 | Garrigues ............. F16K 1/2265 |
| | | | | 251/152 |
| 5,018,548 | A | | 5/1991 | McLennan |
| 5,251,940 | A | | 10/1993 | DeMoss et al. |
| 5,345,964 | A | | 9/1994 | Friedel |
| 8,132,781 | B2 | | 3/2012 | Haunhorst |
| 2007/0023727 | A1 | | 2/2007 | Lasse |
| 2016/0178067 | A1 | * | 6/2016 | Abouelleil ............ F16K 1/2265 |
| | | | | 251/308 |
| 2016/0348800 | A1 | | 12/2016 | Abouelleil et al. |

OTHER PUBLICATIONS

Copenheaver, Blaine R.; Written Opinion from counterpart International patent application No. PCT/US2016/062785, dated Jan. 31, 2017, pp. 1-5, United States Patent and Trademark Office as Searching Authority, Alexandria, Virginia USA.

* cited by examiner

VALVE COUPLING HAVING CENTERING SUPPORT PROJECTIONS

CROSS REFERENCE TO RELATED APPLICATION

This application is based upon and claims benefit of priority to U.S. Provisional Application No. 62/258,797, filed Nov. 23, 2015 and hereby incorporated by reference.

FIELD OF THE INVENTION

This invention relates to fluid control devices that are combinations of valves and mechanical couplings.

BACKGROUND

Fluid control devices which combine mechanical couplings with valves (herein referred to as "valve couplings") are advantageous because they allow for more efficient piping network designs by reducing the number of components in the network. Prior art networks not using valve couplings require two mechanical couplings for each valve in the network, whereas a valve coupling couples a valve directly to pipe elements without the need for multiple mechanical couplings.

It is advantageous for the valve elements of a valve coupling to be securely and reliably housed within the coupling elements to ensure proper coupling between the pipe elements and proper performance of the valve. It is further advantageous if the valve coupling is easy to install into the piping network. There is clearly an opportunity to improve the design of valve couplings.

SUMMARY

The invention concerns a valve coupling for joining pipe elements and controlling flow therethrough. In one example embodiment the valve coupling comprises a plurality of segments attached to one another end to end surrounding a central space. A valve housing is captured between the segments. A valve closing member is movably mounted within the valve housing. The valve closing member is movable between an open position permitting flow through the valve housing and a closed position preventing flow there through. At least one projection extends from one of the segments into the central space. The at least one projection engages the valve housing and supports at least two of the segments in spaced relation.

In an example embodiment, each of the segments comprises a back wall extending between the ends thereof. The at least one projection extends from the back wall of the one segment. By way of example the at least one projection is tapered. In a further example the at least one projection has a U-shaped cross section. In another example the at least one projection is deformable to permit the at least two segments to be drawn toward one another. In a specific example embodiment the valve housing comprises a ring. Further by way of example the valve housing may comprise first and second bonnets which extend in respective directions away from the central space. Each bonnet extends through a respective opening in a first and a second of the segments. In a further example the valve housing comprises at least one channel therein. The at least one channel is positioned to receive the at least one projection. In an example embodiment the valve housing further comprises first and second guide walls positioned in spaced relation to one another on opposite sides of and defining the at least one channel. The guide walls projects away from the central space in an example embodiment. By way of example the at least one channel comprises a floor surface having a concave shape. In another example the valve housing further comprises first and second guide walls positioned in spaced relation to one another on opposite sides of the floor surface, the guide walls projecting away from the central space.

In an example embodiment the at least one channel comprises a first concave cone surface having a first cone axis and a second concave cone surface having a second cone axis. In an example embodiment the first and second cone surfaces are contiguous with one another. In a particular example the first cone axis is angularly oriented with respect to the second cone axis. Another example embodiment comprises at least one tooth positioned within the at least one channel and projecting away from the central space. By way of example attachment members are located at opposite ends of each segment. Arcuate surfaces are positioned on opposite sides of each the segment for engagement with the pipe elements in an example embodiment. In a specific example the attachment members comprise lugs extending outwardly from opposite ends of each segment. Each attachment lug defines a hole for receiving a fastener.

In another example embodiment the arcuate surfaces project from the segments toward an axis passing through the central space. In a specific example embodiment the plurality of segments comprises no more than two the segments. Further by way of example the valve closing member is rotatable about an axis of rotation. In a specific example the valve closing member comprises a disk.

The invention further encompasses a valve coupling for joining pipe elements and controlling flow therethrough. In an example embodiment the valve coupling comprises first and second segments attached to one another end to end surrounding a central space. A valve housing is captured between the segments. A valve closing member is movably mounted within the valve housing. The valve closing member is movable between an open position permitting flow through the valve housing and a closed position preventing flow there through. At least two projections extend from each of the segments into the central space. Each of the projections engages the valve housing and supports the first and second segments in spaced relation.

In a specific example embodiment each of the segments comprises a back wall extending between the ends thereof. The projections extend from the back wall of the first and second segments. In a further example each one of the projections is tapered. In another example each one of the projections has a U-shaped cross section. Further by way of example each one of the projections is deformable to permit the first and second segments to be drawn toward one another. In a specific example embodiment the valve housing comprises a ring.

In a further example embodiment the valve housing comprises first and second bonnets which extend in respective directions away from the central space. Each bonnet extends through a respective opening in a first and a second of the segments. In a particular example embodiment the valve housing comprises at least four channels therein. Each channel is positioned to receive a respective one of the projections.

By way of example the valve housing further comprises first and second guide walls positioned in spaced relation to one another on opposite sides of and defining a first and a second of the channels. Third and fourth guide walls are positioned in space relation to one another on opposite sides of and defining a third and fourth of the channels. The guide walls project away from the central space. In a specific example each one of the channels comprises a floor surface having a concave shape. In an example embodiment the valve housing further comprises a pair of guide walls positioned in spaced relation to one another on opposite sides of each one of the floor surfaces. The guide walls project away from the central space.

In an example embodiment each one of the channels comprises a first concave cone surface having a first cone axis and a second concave cone surface having a second cone axis. In an example embodiment the first and second cone surfaces are contiguous with one another. Further by way of example the first cone axis is angularly oriented with respect to the second cone axis. A example embodiment further comprises a plurality of teeth. At least one tooth positioned within each one of the channels, the teeth projecting away from the central space.

In an example embodiment attachment members are located at opposite ends of each segment. Arcuate surfaces are positioned on opposite sides of each segment for engagement with the pipe elements. In one example embodiment the attachment members comprise lugs extending outwardly from opposite ends of each the segment. Each lug defines a hole for receiving a fastener. In an example embodiment the arcuate surfaces project from the segments toward an axis passing through the central space. In a further example embodiment the valve closing member is rotatable about an axis of rotation. In a specific example embodiment the valve closing member comprises a disk. By way of example the projections support the segments in spaced relation sufficient to insert the pipe elements into the central space.

The invention further encompasses a method of joining pipe elements to a valve. In one example embodiment the method comprises:

holding a plurality of segments of a coupling in spaced relation about a central space by engaging a plurality of projections extending from the segments with a valve housing surrounded by the segments;

inserting the pipe elements into the central space;

drawing the segments toward one another thereby deforming the projections and engaging the segments with the pipe elements.

In a specific example embodiment the engaging comprises engaging each the projection with a respective channel positioned in the valve housing. Further by way of example the engaging comprises engaging each projection with at least one tooth positioned within each the channel.

DETAILED DESCRIPTION

Figure 1:
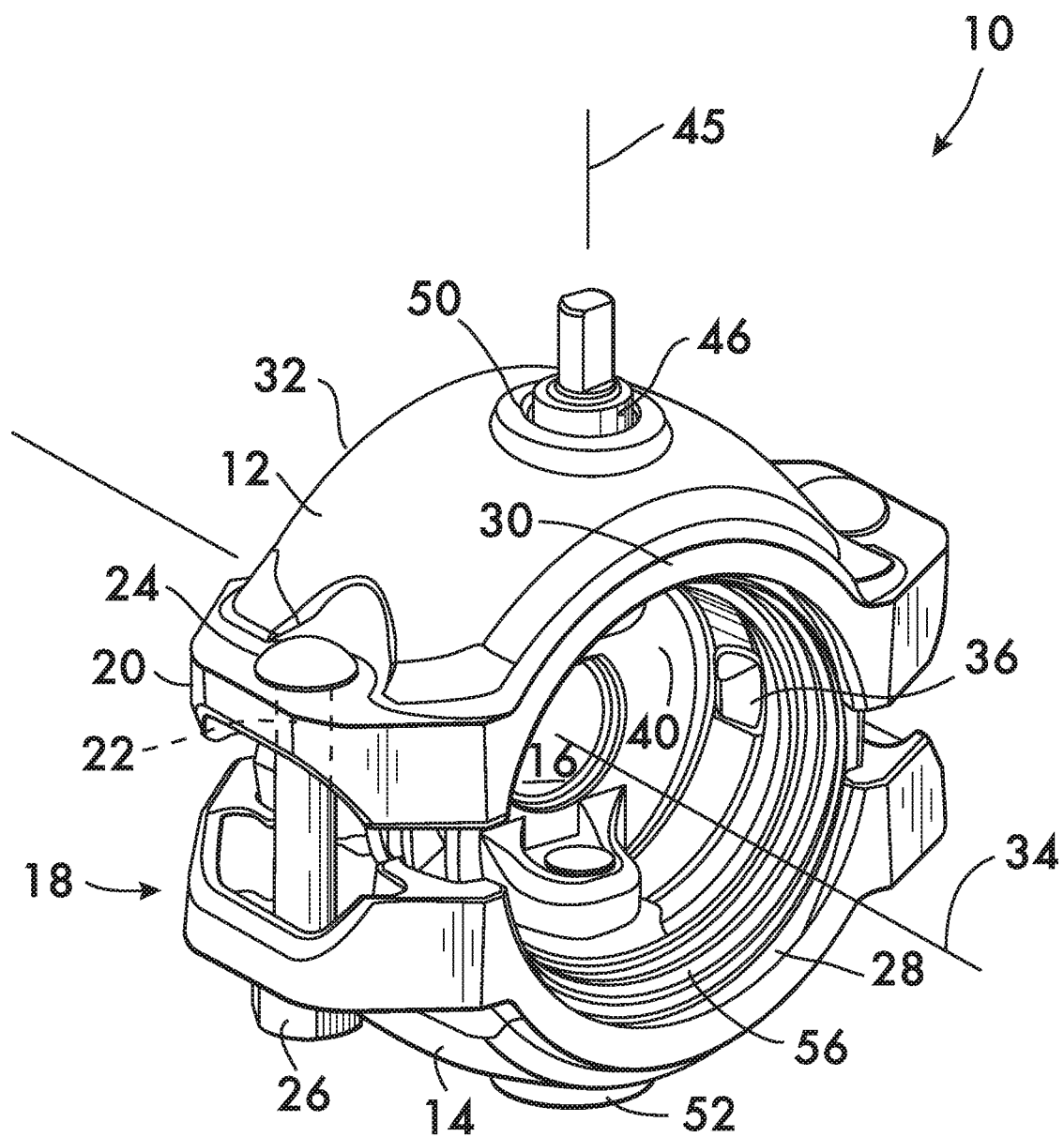
FIG. 1 is an isometric view of an example embodiment of a valve coupling according to the invention, the valve coupling being shown in a pre-assembled state.

FIG. 1 shows an example embodiment of a combination valve and mechanical coupling 10, hereafter referred to as a valve coupling. Valve coupling 10 comprises a plurality of segments, in this example, two segments 12 and 14 attached to one another end to end to surround and define a central space 16. Attachment of segments 12 and 14 is effected by adjustable attachment members 18 located at each end of each segment. In this example the attachment members comprise lugs 20 which extend outwardly from the segments 12 and 14, the lugs having holes 22 that receive adjustable fasteners, such as bolts 24 and nuts 26. Tightening of the nuts 26 draws the segments 12 and 14 toward one another as described below.

Segments 12 and 14 each have arcuate surfaces 28 positioned on opposite sides 30 and 32 of segments 12 and 14. Arcuate surfaces 28 face a longitudinal axis 34 that passes through the central space 16 and are engageable with pipe elements when they are inserted between the segments 12 and 14 and into central space 16 as described below. The arcuate surfaces 28 may comprise projections, known as "keys", which engage circumferential grooves in the pipe elements upon tightening of the attachment members 18 and provide mechanical engagement to secure the pipe elements in end to end relation to form a joint. The keys may also engage pipe elements having plain end, or ends having a shoulder and/or a bead as are known in the art.

Figure 2:
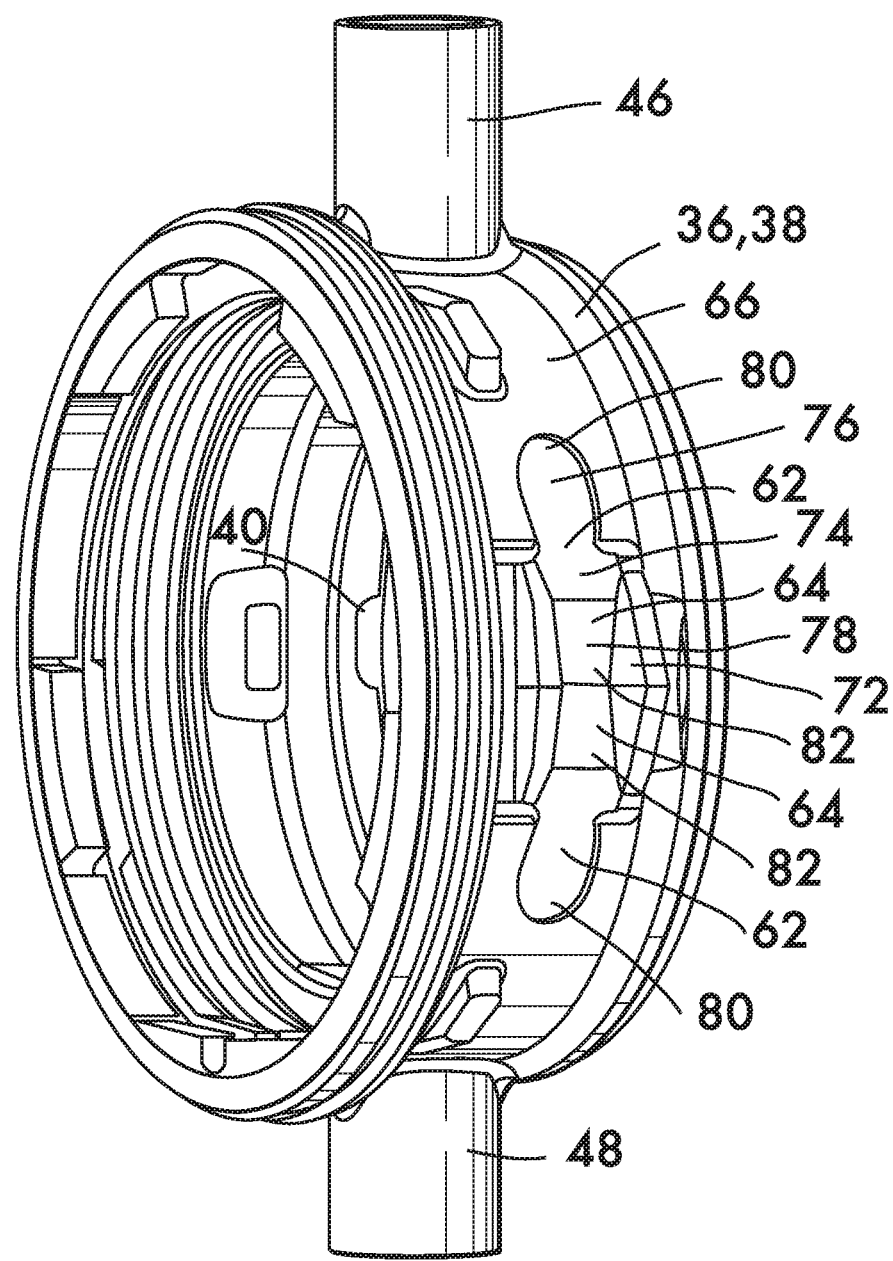
FIG. 2 is an isometric view of an example valve housing used with the valve coupling of FIG. 1.
Figure 3:
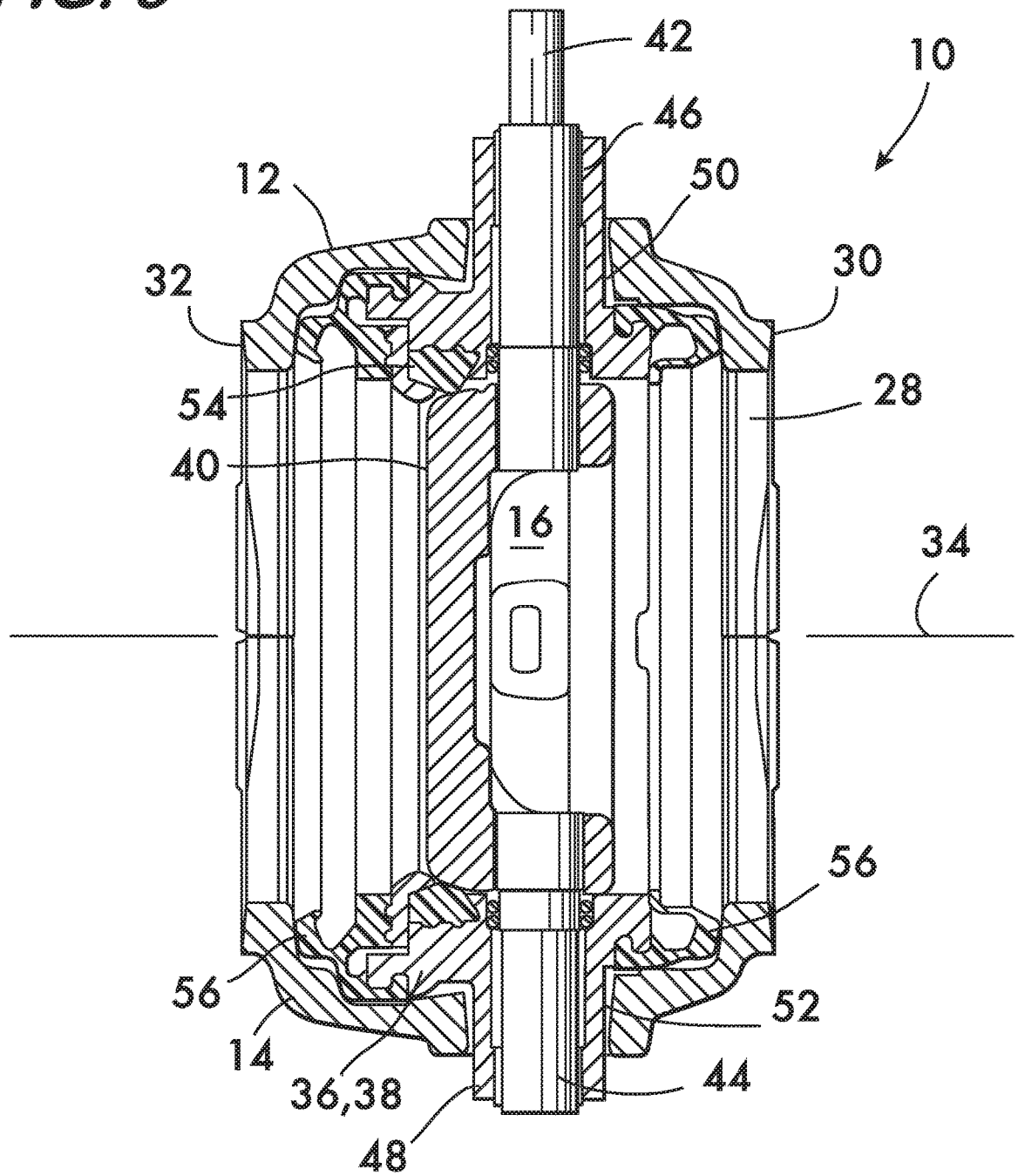
FIG. 3 is a longitudinal sectional view of the valve coupling shown in FIG. 1.

FIGS. 1 and 2 show a valve housing 36 that is positioned within central space 16 and captured between segments 12 and 14. In this example embodiment valve housing 36 comprises a ring 38 in which a valve closing member 40, in this example a disk, is movably mounted. Other example valve closing members usable with this invention include ball closing members and plug closing members. As shown in FIG. 3, valve closing member 40 is rotatably mounted on valve stems 42 and 44 within ring 38 and rotatable about an axis 45 between an open position and a closed position (shown). Stems 42 and 44, which define axis 45, are received within respective bonnets 46 and 48 that extend from the ring 38 and comprise bearings for the valve stems. The bonnets 46 and 48 in turn extend through respective openings 50 and 52 (see also FIG. 3) in segments 12 and 14. Engagement of segments 12 and 14 with bonnets 46 and 48 where the bonnets protrude through the segments helps to stabilize the valve housing 36 within the central space 16. As shown in FIG. 3, ring 38 further houses a seal 54. Seal 54 surrounds the central space 16 and sealingly engages the valve closing member 40 when it is in the closed position. Other seals 56, shown in FIGS. 1 and 3, are positioned between the segments 12 and 14 and the valve housing 36. Seals 56 establish a seal between the segments 12 and 14, the valve housing 36 and pipe elements when a joint is created by tightening the attachment members 18 to draw the segments toward one another and engage the pipe elements to create a joint.

It is advantageous to support segments 12 and 14 in spaced apart relation (as shown in FIG. 1) sufficient to permit insertion of pipe elements into the central space 16 without the need to first disassemble the valve coupling 10. FIG. 1 shows the valve coupling 10 in the so-called "pre-assembled state", as it would be supplied to the end user, with the segments 12 and 14 connected in end to end relation by the attachment members 18 (lugs 20, bolts 24 and nuts 26) yet supported in spaced relation to permit pipe element insertion. This configuration allows for efficient formation of a joint, as all that is required is for the pipe elements to be inserted into the central space 16 (in engagement with seals 56) and the nuts 26 tightened to draw segments 12 and 14 toward one another and into engagement with the pipe elements.

Figure 4:
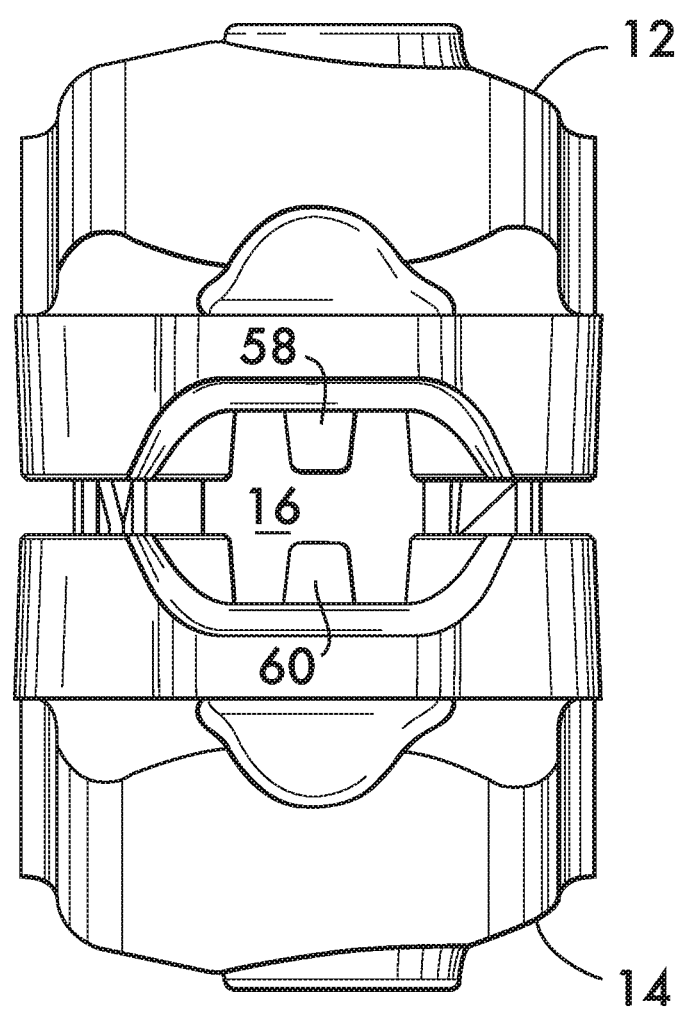
FIG. 4 is a side view of components of the valve coupling shown in FIG. 1.
Figure 5:
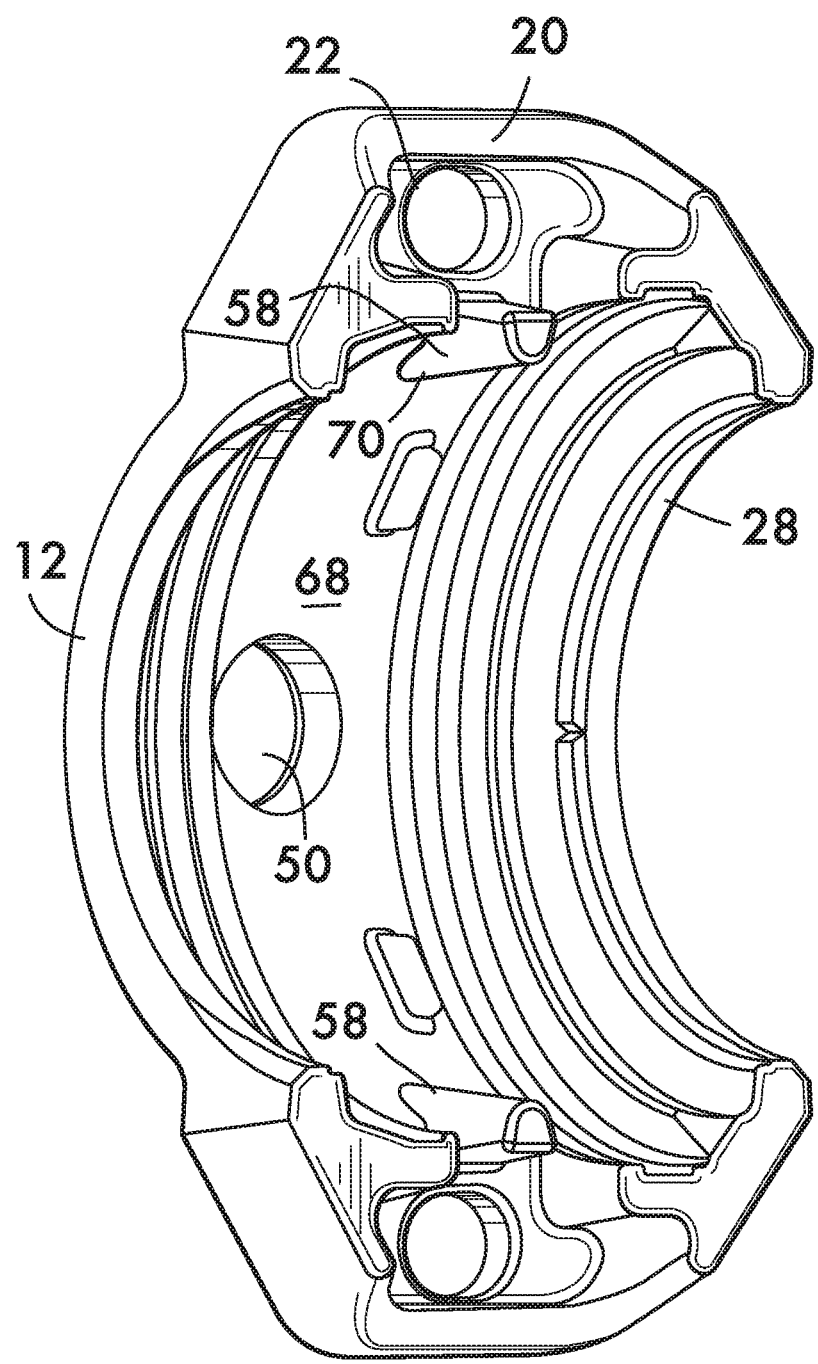
FIG. 5 is an isometric view of a component of the valve coupling shown in FIG. 1.
Figure 6:
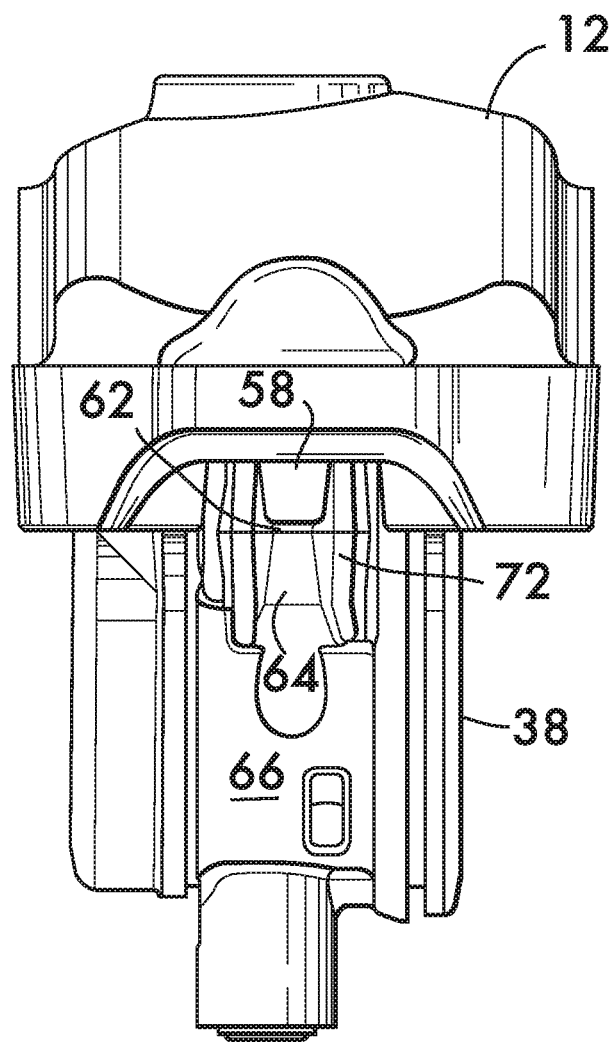
FIG. 6 is a side view of a partially assembled example of a valve coupling according to the invention.

To hold the segments 12 and 14 in spaced apart relation the segments have respective projections 58 and 60 (see FIGS. 4 and 5) that extend into the central space 16 and cooperate with respective channels 62 and 64 in the outer surface 66 of ring 38 (see FIGS. 2 and 6). The example embodiment illustrated has four projections (two per segment) and four channels. As shown in FIG. 5, segments 12 and 14 (12 shown) have a back wall 68 from which the projections 58 and 60 extend. In this example embodiment the projections 58 and 60 are tapered and have a "U" shaped cross section (other shapes are of course feasible). The convex surface 70 of the "U" of each projection 58 and 60 faces the surface 66 of ring 38 and contacts it within respective channels 62 and 64 when the ring 38 is captured between the segments 12 and 14. The stiffness of the projections 58 and 60 is designed to support the segments 12 and 14 in spaced relation on the ring 38 (see FIG. 1) under forces experienced due to the weight of the segments and inertial loads due to handing and installation. However, the projections are designed to deform when force is applied by tightening the connection members 18 to permit the segments to be drawn toward one another and into engagement with the pipe elements during installation as shown in FIG. 9.

Figure 2A:
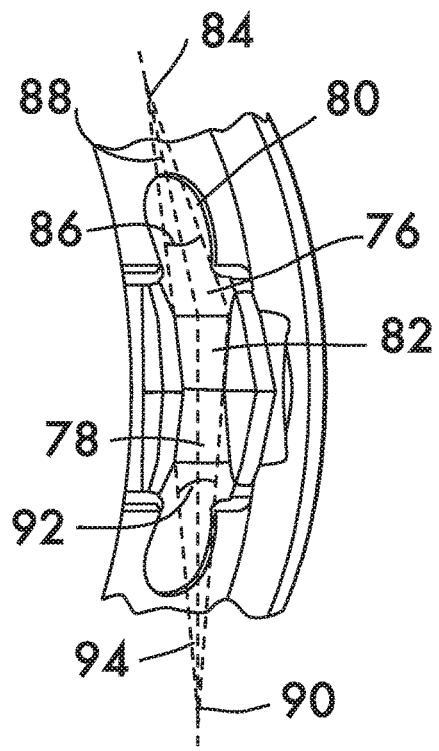
FIG. 2A is an isometric view of a portion of the valve housing shown in FIG. 2.

Channels 62 and 64, shown in detail in FIG. 2, may be defined by or have guide walls 72 positioned in spaced relation on the ring 38 and spaced to receive the projections 58 and 60 when the valve coupling 10 is in its pre-assembled state. The floor surface 74 of each channel 62 and 64, which comprises a portion of the outer surface 66 of ring 38 between the guide walls 72, is divided into two concave regions 76 and 78. As shown in FIG. 2A each concave region 76 and 78 forms a portion of a cone surface 80 and 82. In this example embodiment the cone surfaces are contiguous with one another. Cone surface 80 has an apex 84, a cone angle 86, and a cone axis 88. Cone surface 82 has an apex 90, a cone angle 92, and a cone axis 94. Apex 84 is different from apex 90; cone angle 86 is different from cone angle 92; and cone axis 88 is angularly oriented with respect to cone axis 94.

Figure 2B:
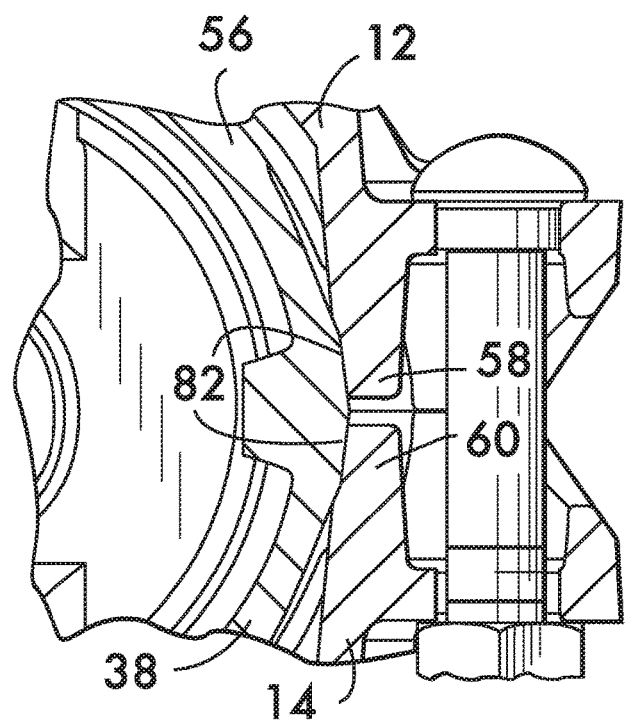
FIGS. 2B, 2C and 2D are cross sectional views of portions of the valve coupling shown in FIG. 1.

Cone surfaces 80 provide clearance to permit projections 58 and 60 to engage cone surfaces 82 when the segments 12 and 14 are positioned surrounding the ring 38. As shown in FIG. 2B, the parameters of cone surface 82 (apex 90, cone angle 92 and cone axis 94) are designed to receive a projection (58 or 60) and cooperate with that projection to maintain the segments 12 and 14 in spaced relation as shown in FIG. 1. In the absence of deformation of projections 58 and 60 the segments 12 and 14 are maintained in spaced apart relation and provide sufficient clearance to permit insertion of pipe elements. Additionally, interaction between the projections 58 and 60 and the cone surfaces 82 keeps the ring 38 centered between the two segments 12 and 14. Centering of ring 38 also ensures that the seal 56 is centered between the segments so that it does not cause interference during insertion of the pipe elements.

Figure 2C:
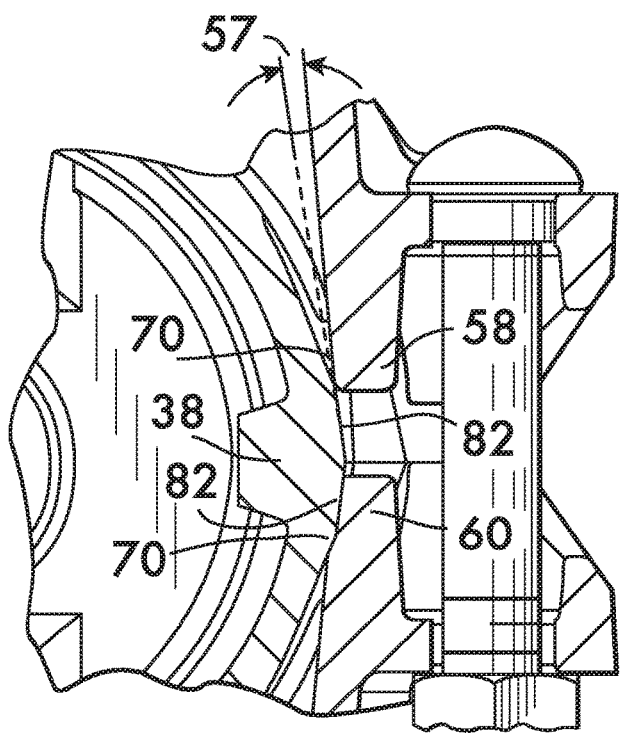
Figure 2D:
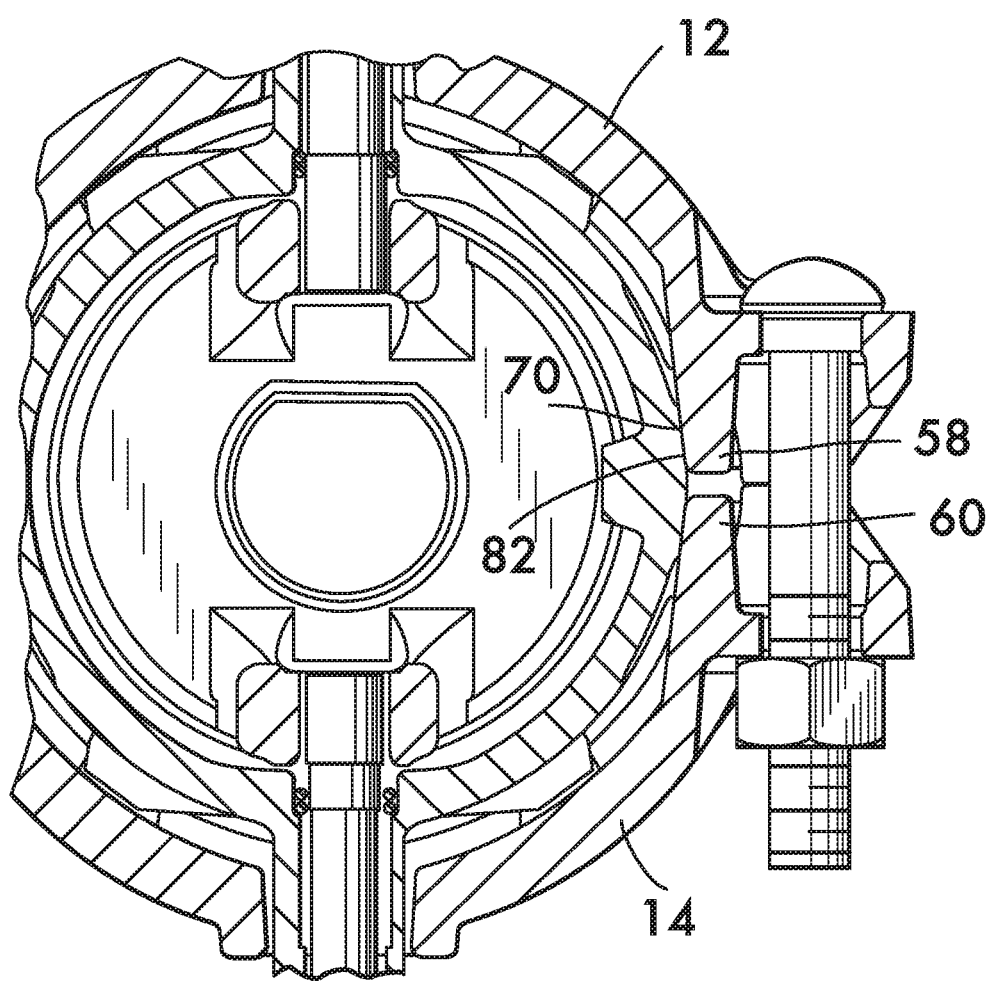
Figure 2E:
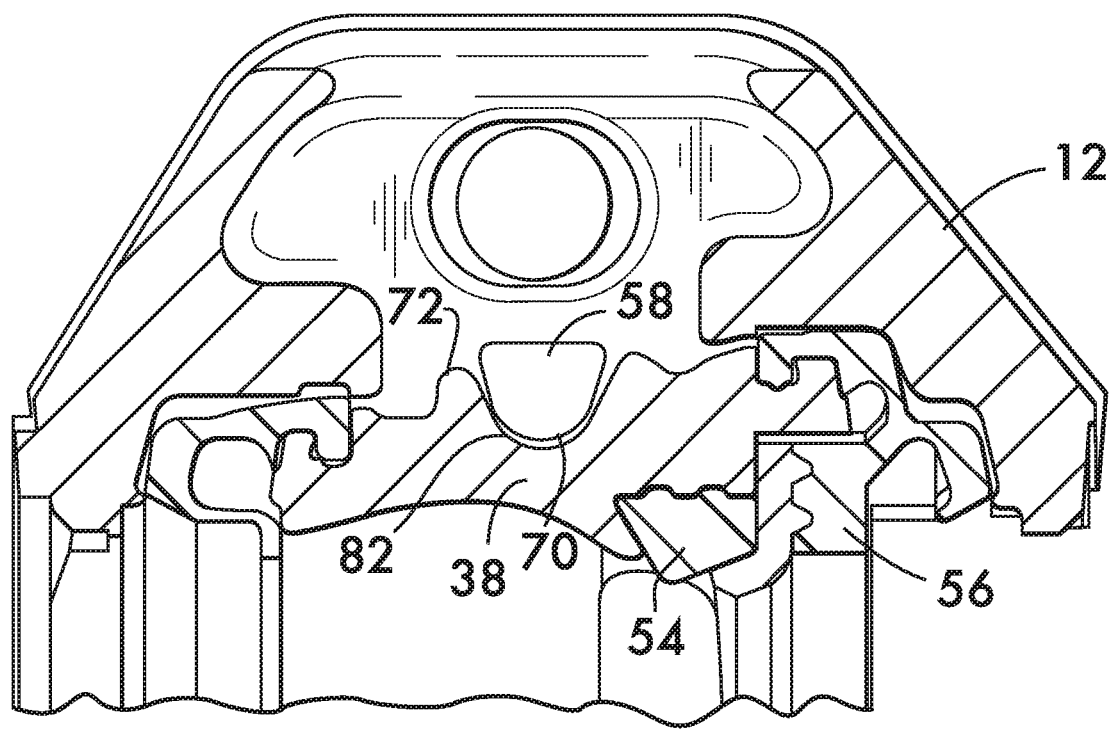
FIG. 2E is a partial sectional view of a portion of the valve coupling shown in FIG. 1.
Figure 2F:
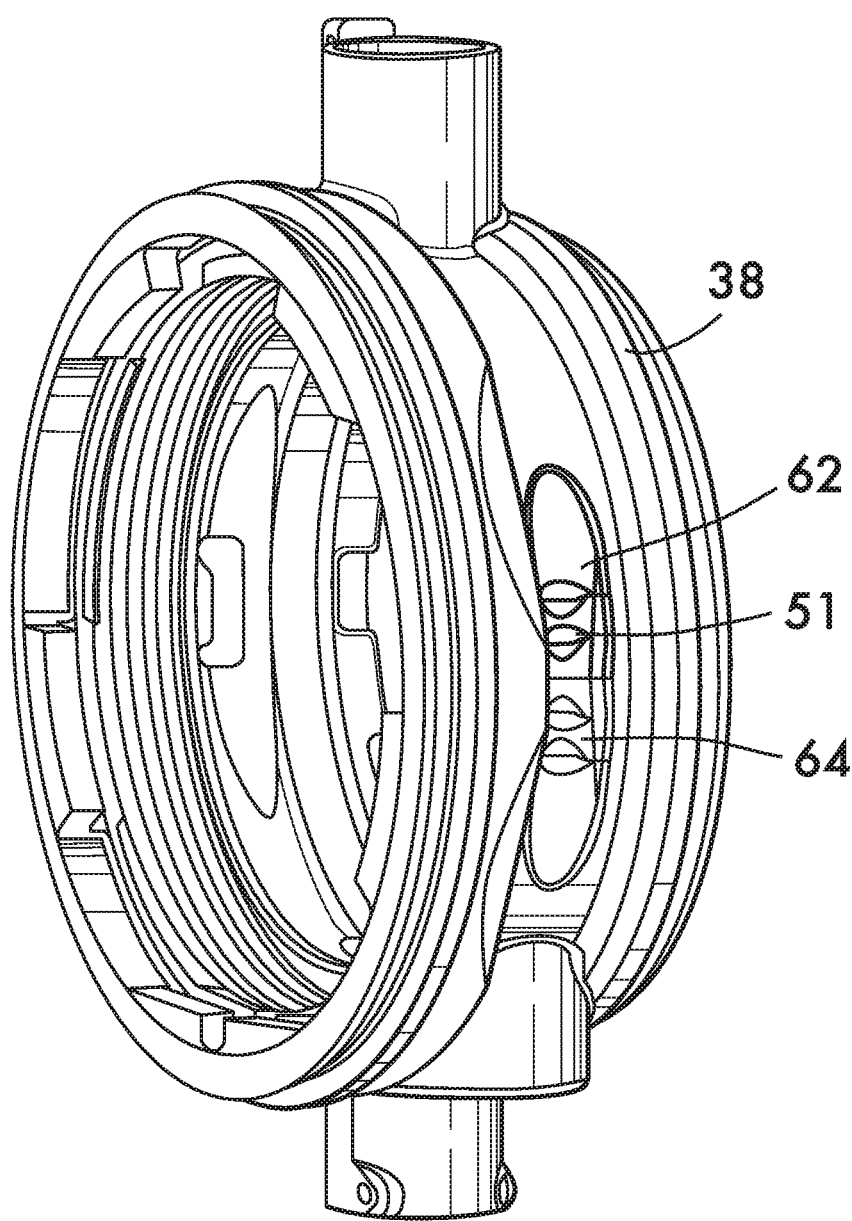
FIG. 2F is an isometric view of an example valve housing used with the valve coupling of FIG. 1.
Figure 2G:
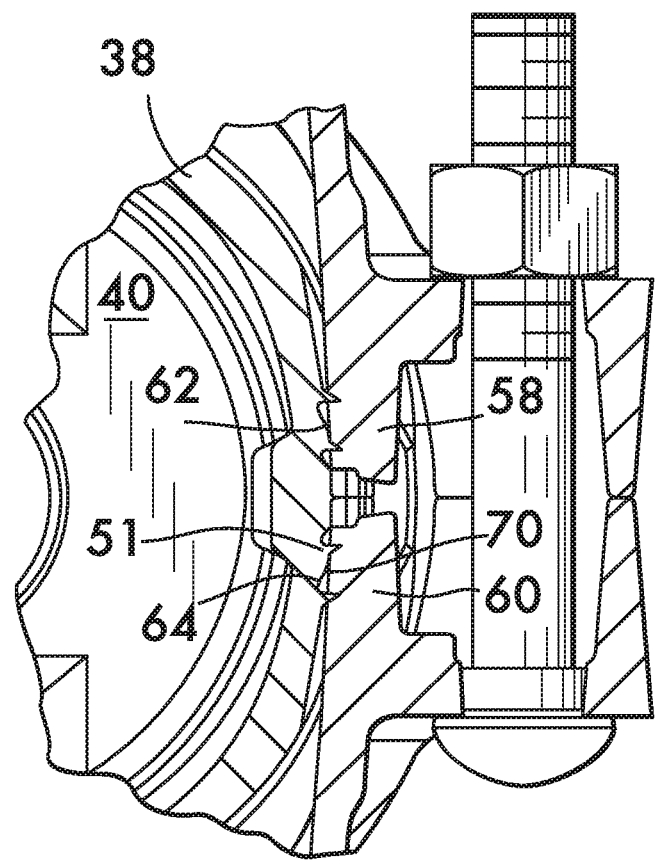
FIG. 2G is a cross sectional view of a portion of an example valve coupling comprising the valve housing shown in FIG. 2F.
Figure 9:
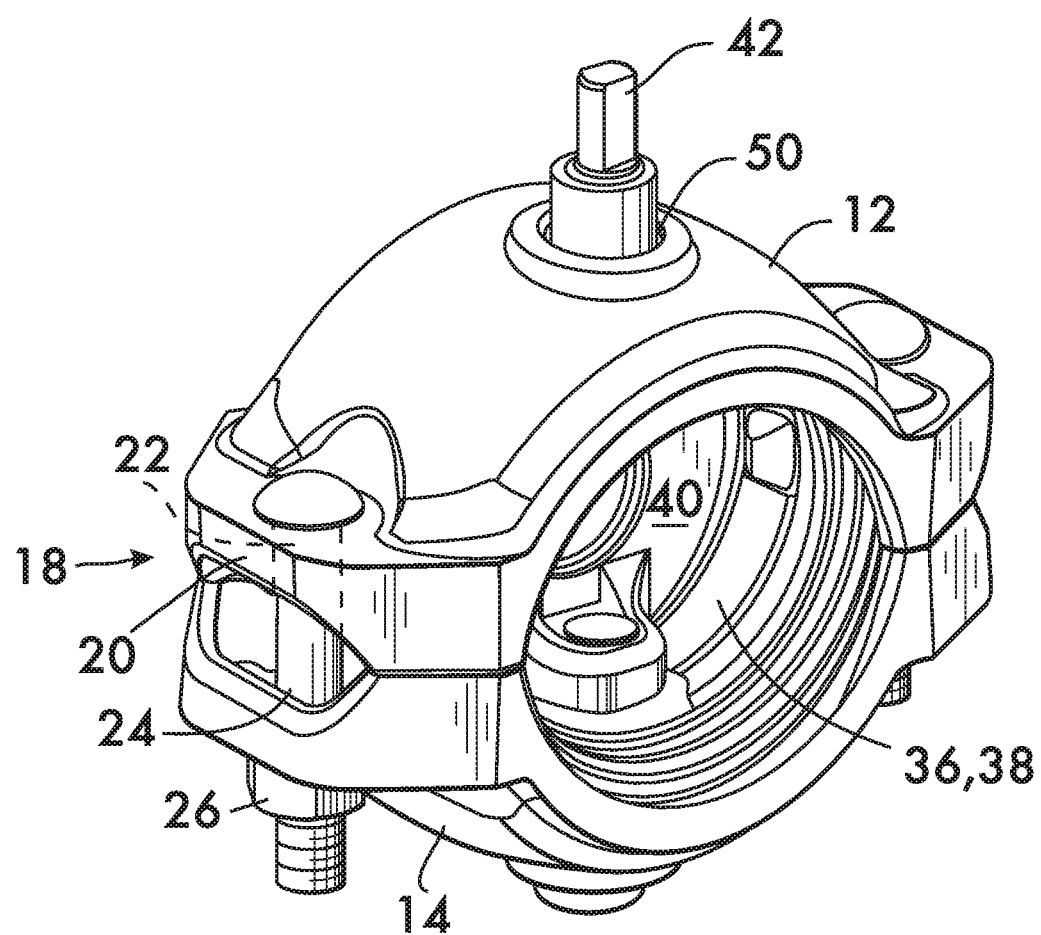
FIG. 9 is an isometric view of the example valve coupling shown in FIG. 1 as it would appear in use.

The parameters of cone surface 82 (apex 90, cone angle 92 and cone axis 94) are designed to provide a locking action between the projections 58 and 60 and the ring 38 when the attachment members 18 are tightened and the segments are drawn toward one another to form the joint as shown in FIG. 9. To this end, as shown in FIG. 2C, the projections 58 and 60 are angularly oriented with respect to the conical surfaces 82. In a practical example, the orientation angle 57 between the conical surfaces 82 and the convex surfaces 70 of projections 58 and 60 is approximately 3 degrees. This relative angular orientation causes a camming effect (see FIGS. 2D, 2E) wherein the clamping force between the conical surfaces 82 and projections 58 and 60 is much greater than the bolt load which draws the segment 12 and 14 together. That greater clamping force deforms the projections 58 and 60 as they interact with the conical surfaces 82 to locate and lock the ring 38 in the axial direction. Mechanical engagement between the projections 58, 60 and the ring 38 may be augmented by positioning one or more teeth 51 within the channels 62 and 64 as shown in FIGS. 2F and 2G. The teeth 51 bite into the convex surfaces 70 of the projections 58 and 60 to lock the segments 12 and 14 to the ring 38. The teeth 51 also compensate for dimensional variations of the various parts due to casting and machining tolerances and ensure a secure fit between the segments and the ring.

Figure 7:
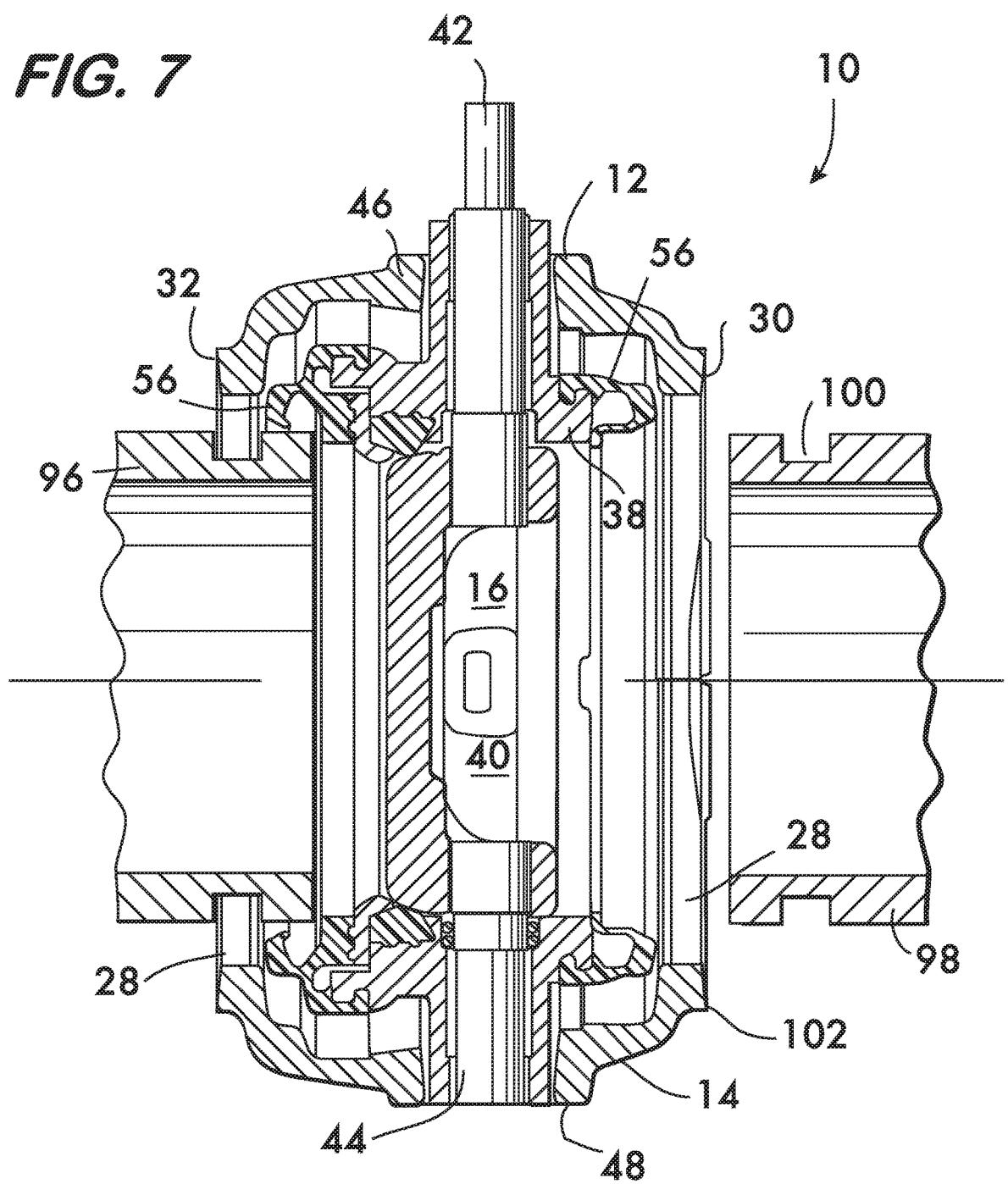
FIGS. 7 and 8 illustrate use of the valve coupling shown in FIG. 1 to connect pipe elements in end to end relation.
Figure 8:
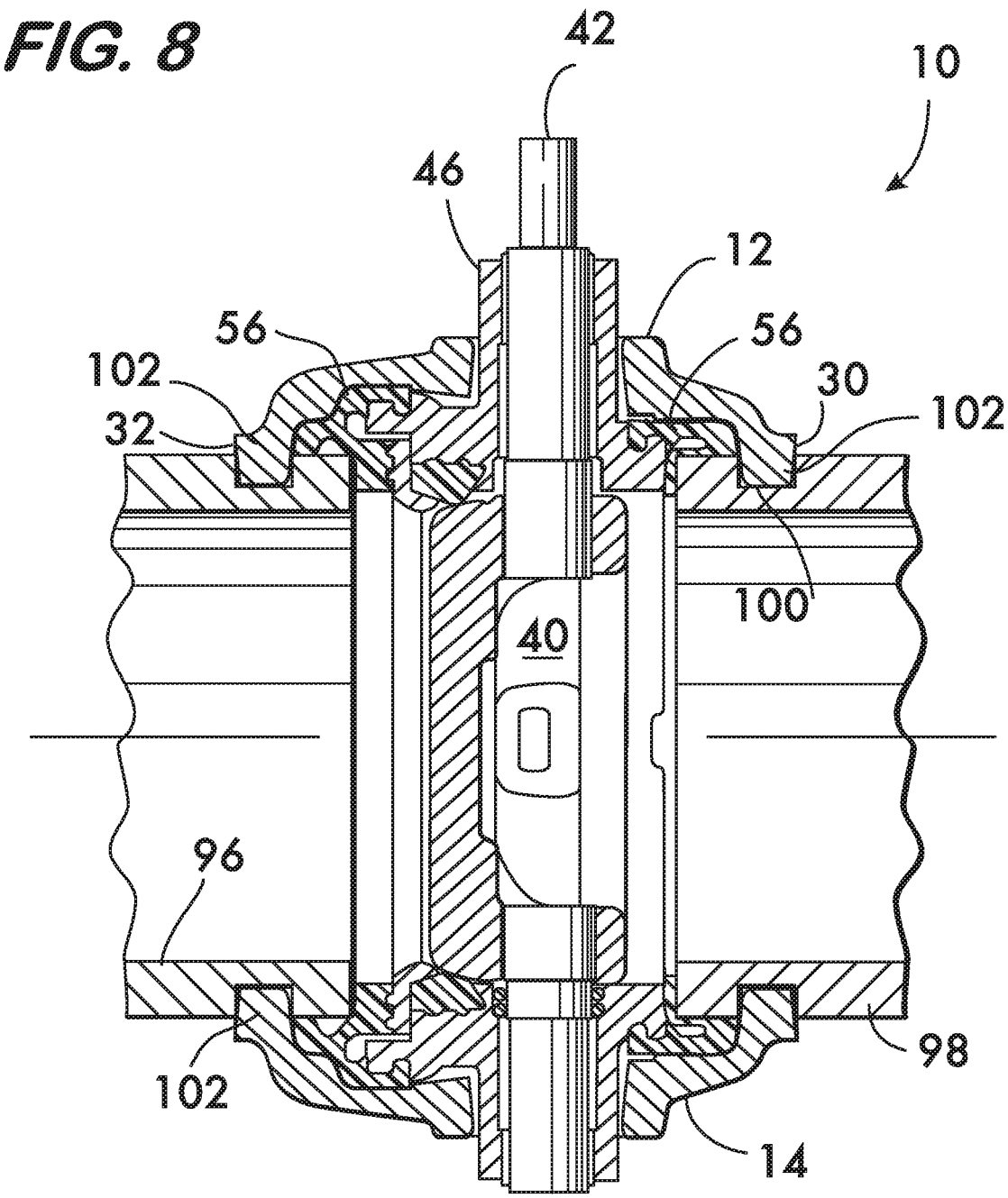

In use, as shown in FIG. 7, a valve coupling 10 is provided in the pre-assembled state (see also FIG. 1) with segments 12 and 14 positioned in spaced apart relation, the projections 58 and 60 received within channels 62 and 64 of ring 38, the projections engaging cone surfaces 80 (see FIGS. 2 and 5) and supporting the segments on the ring 38. Pipe elements 96 and 98 are inserted into the central space 16 between the segments 12 and 14 and into engagement with seals 56. In this example, the pipe elements have circumferential grooves 100 that receive arcuate surfaces 28 on projecting keys 102 arrayed on opposite sides 30 and 32 of the segments. As shown in FIG. 8, the attachment members are tightened (nuts 26 tightened on bolts 24 engaging lugs 20, see FIG. 1) to draw the segments 12 and 14 toward one another and into engagement with the pipe elements 96 and 98, the keys 102 engaging circumferential grooves 100 in the pipe elements. As the segments 12 and 14 are drawn toward one another the seals 56 are compressed between the segments 12 and 14, the valve housing 36 and the pipe elements 96 and 98 to form a fluid tight joint. Further, as shown in FIG. 2D, as the segments are drawn together the projections 58 and 60 deform and engage cone surfaces 82 on the outer surface 66 of ring 38. Interaction between the projections 58 and 60 and the cone surfaces 82 locks the segments 12 and 14 to the valve housing 36. Mechanical engagement is further enhanced if teeth 51 are present (see FIG. 2G). FIG. 9 shows the final configuration of the valve coupling 10 upon joint installation, the pipe elements not shown for clarity. Note that in this example embodiment the connection members 18 meet in what is known as "pad to pad" engagement when the valve coupling 10 is properly installed. This design is advantageous because it permits ready visual inspection confirming proper installation, and eliminates the need to tighten the bolts 24 to a specific torque value.

What is claimed is:

1. A valve coupling for joining pipe elements and controlling flow therethrough, said valve coupling comprising:
    a plurality of segments attached to one another end to end and circumferentially surrounding a central space;
    a valve housing captured between said segments;
    a valve closing member movably mounted within said valve housing, said valve closing member movable between an open position permitting flow through said valve housing and a closed position preventing flow there through;
    at least one projection extending from one of said segments into said central space, said at least one projection engaging said valve housing and supporting at least two of said segments in spaced relation; attachment members located at opposite ends of each said segment; arcuate surfaces positioned on opposite sides of each said segment for engagement with said pipe elements.

2. The valve coupling according to claim 1, wherein each of said segments comprises a back wall extending between said ends thereof, said at least one projection extending from said back wall of said one segment.

3. The valve coupling according to claim 1, wherein said at least one projection is tapered.

4. The valve coupling according to claim 1, wherein said at least one projection has a U-shaped cross section.

5. The valve coupling according to claim 1, wherein said at least one projection is deformable to permit said at least two segments to be drawn toward one another.

6. The valve coupling according to claim 1, wherein said valve housing comprises a ring.

7. The valve coupling according to claim 1, wherein said valve housing comprises first and second bonnets which extend in respective directions away from said central space, each said bonnet extending through a respective opening in a first and a second of said segments.

8. The valve coupling according to claim 1, wherein said valve housing comprises at least one channel therein, said at least one channel positioned to receive said at least one projection.

9. The valve coupling according to claim 8, wherein said valve housing further comprises first and second guide walls positioned in spaced relation to one another on opposite sides of and defining said at least one channel, said guide walls projecting away from said central space.

10. The valve coupling according to claim 8, wherein said at least one channel comprises a floor surface having a concave shape.

11. The valve coupling according to claim 10, wherein said valve housing further comprises first and second guide walls positioned in spaced relation to one another on opposite sides of said floor surface, said guide walls projecting away from said central space.

12. The valve coupling according to claim 8, wherein said at least one channel comprises:
    a first concave cone surface having a first cone axis;
    a second concave cone surface having a second cone axis.

13. The valve coupling according to claim 12, wherein said first and second cone surfaces are contiguous with one another.

14. The valve coupling according to claim 12, wherein said first cone axis is angularly oriented with respect to said second cone axis.

15. The valve coupling according to claim 8, further comprising at least one tooth positioned within said at least one channel and projecting away from said central space.

16. The valve coupling according to claim 1, wherein said attachment members comprise lugs extending outwardly from opposite ends of each said segment, each said attachment lug defining a hole for receiving a fastener.

17. The valve coupling according to claim 1, wherein said arcuate surfaces project from said segments toward an axis passing through said central space.

18. The valve coupling according to claim 1, wherein said plurality of segments comprises no more than two said segments.

19. The valve coupling according to claim 1, wherein said valve closing member is rotatable about an axis of rotation.

20. The valve coupling according to claim 19, wherein said valve closing member comprises a disk.

21. A valve coupling for joining pipe elements and controlling flow therethrough, said valve coupling comprising:
    first and second segments attached to one another end to end and circumferentially surrounding a central space;
    a valve housing captured between said segments;
    a valve closing member movably mounted within said valve housing, said valve closing member movable between an open position permitting flow through said valve housing and a closed position preventing flow there through;
    at least two projections extending from each of said segments into said central space, each of said projections engaging said valve housing and supporting said first and second segments in spaced relation; attachment members located at opposite ends of each said segment; arcuate surfaces positioned on opposite sides of each said segment for engagement with said pipe elements.

22. The valve coupling according to claim 21, wherein each of said segments comprises a back wall extending between said ends thereof, said projections extending from said back wall of said first and second segments.

23. The valve coupling according to claim 21, wherein each one of said projections is tapered.

24. The valve coupling according to claim 21, wherein each one of said projections has a U-shaped cross section.

25. The valve coupling according to claim 21, wherein each one of said projections is deformable to permit said first and second segments to be drawn toward one another.

26. The valve coupling according to claim 21, wherein said valve housing comprises a ring.

27. The valve coupling according to claim 21, wherein said valve housing comprises first and second bonnets which extend in respective directions away from said central space, each said bonnet extending through a respective opening in a first and a second of said segments.

28. The valve coupling according to claim 21, wherein said valve housing comprises at least four channels therein, each said channel positioned to receive a respective one of said projections.

29. The valve coupling according to claim 28, wherein said valve housing further comprises:
    first and second guide walls positioned in spaced relation to one another on opposite sides of and defining a first and a second of said channels;
    third and fourth guide walls positioned in space relation to one another on opposite sides of and defining a third and fourth of said channels, said guide walls projecting away from said central space.

30. The valve coupling according to claim 28, wherein each one of said channels comprises a floor surface having a concave shape.

31. The valve coupling according to claim 30, wherein said valve housing further comprises:
 a pair of guide walls positioned in spaced relation to one another on opposite sides of each one of said floor surfaces, said guide walls projecting away from said central space.

32. The valve coupling according to claim 28, wherein each one of said channels comprises:
 a first concave cone surface having a first cone axis;
 a second concave cone surface having a second cone axis.

33. The valve coupling according to claim 32, wherein said first and second cone surfaces are contiguous with one another.

34. The valve coupling according to claim 32, wherein said first cone axis is angularly oriented with respect to said second cone axis.

35. The valve coupling according to claim 28, further comprising a plurality of teeth, at least one said tooth positioned within each one of said channels, said teeth projecting away from said central space.

36. The valve coupling according to claim 21, wherein said attachment members comprise lugs extending outwardly from opposite ends of each said segment, each said lug defining a hole for receiving a fastener.

37. The valve coupling according to claim 21, wherein said arcuate surfaces project from said segments toward an axis passing through said central space.

38. The valve coupling according to claim 21, wherein said valve closing member is rotatable about an axis of rotation.

39. The valve coupling according to claim 38, wherein said valve closing member comprises a disk.

40. The valve coupling according to claim 21, wherein said projections support said segments in spaced relation sufficient to insert said pipe elements into said central space.

\* \* \* \* \*